United States Patent
Okuno

(10) Patent No.: US 11,321,067 B2
(45) Date of Patent: May 3, 2022

(54) SOFTWARE INSTALLING AND UPDATING METHOD, AND PROCESS VIA COMMUNICATION INTERFACE

(71) Applicant: BROTHER KOGYO KABUSHIKI KAISHA, Nagoya (JP)

(72) Inventor: Tetsuya Okuno, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/031,038

(22) Filed: Sep. 24, 2020

(65) Prior Publication Data
US 2021/0096836 A1  Apr. 1, 2021

(30) Foreign Application Priority Data
Sep. 27, 2019 (JP) .............................. JP2019-177273

(51) Int. Cl.
*G06F 8/61* (2018.01)
*G06F 11/30* (2006.01)
*G06F 11/32* (2006.01)

(52) U.S. Cl.
CPC ............ *G06F 8/61* (2013.01); *G06F 11/3055* (2013.01); *G06F 11/327* (2013.01)

(58) Field of Classification Search
CPC ....... G06F 8/61; G06F 11/3055; G06F 11/327
USPC .................................. 717/168–175; 709/203
See application file for complete search history.

(56) References Cited

U.S. PATENT DOCUMENTS 5,477,264 A * 12/1995 Sarbadhikari ........ H04N 1/2137
348/231.6
5,566,335 A * 10/1996 Nash ........................ G06F 8/66
712/E9.007
5,878,256 A * 3/1999 Bealkowski ........ G06F 11/1433
713/2

(Continued)

FOREIGN PATENT DOCUMENTS

| JP | 2015-52996 A | 3/2015 |
| JP | 2018-97888 A | 6/2018 |

OTHER PUBLICATIONS

Jun-Jun et al, "Secure Software Download Framework Based on Mobile Trusted Computing", IEEE, pp. 171-176 (Year: 2009).*

(Continued)

*Primary Examiner* — Anil Khatri
(74) *Attorney, Agent, or Firm* — Scully, Scott, Murphy & Presser, PC

(57) ABSTRACT

An information processing apparatus has a communication interface, a user interface and a controller. The controller is configured to perform, in response to receipt of a request for installation of software in the information processing apparatus via the communication interface, determining whether the information processing apparatus is in a first status or a second status. When it is determined that information processing apparatus is in the first status, the controller is configured to obtain user approval of installation through the user interface and installing the software in accordance with the request for installation when the user approval is obtained. When it is determined that the information processing apparatus is in the second status, the controller is configured to install the software in accordance with the request for installation without obtaining the user approval.

20 Claims, 10 Drawing Sheets

(56) References Cited

U.S. PATENT DOCUMENTS

| | | | | |
|---|---|---|---|---|
| 6,347,398 B1* | 2/2002 | Parthasarathy | ............ | G06F 8/60 707/999.202 |
| 6,360,362 B1* | 3/2002 | Fichtner | .................... | G06F 8/65 717/168 |
| 6,802,061 B1* | 10/2004 | Parthasarathy | ........... | G06F 8/61 717/120 |
| 6,804,774 B1* | 10/2004 | Larvoire | ............... | G06F 9/4406 713/2 |
| 7,552,432 B2* | 6/2009 | Aiba | ..................... | G06F 9/4411 709/221 |
| 7,581,217 B2* | 8/2009 | Jhanwar | .................... | G06F 8/65 717/168 |
| 8,527,982 B1* | 9/2013 | Sapuntzakis | .............. | G06F 8/61 717/174 |
| 8,612,773 B2* | 12/2013 | Nataraj | ................. | H04L 9/3234 713/192 |
| 9,038,056 B1* | 5/2015 | Wong | ........................ | G06F 8/65 717/173 |
| 2016/0196130 A1 | 7/2016 | Shimizu | | |
| 2016/0299749 A1* | 10/2016 | Sharma | ................... | H04L 67/42 |

OTHER PUBLICATIONS

Santinelli et al, "Installing and Configuring Application Software on the LHC Computing Grid", IEEE, pp. 1-8 (Year: 2005).*

Berthier et al, "Analyzing the Process of Installing Rogue Software", IEEE, pp. 560-565 (Year: 2009).*

Gupta et al, "A Formal Framework for Online Software Version Change", IEEE, pp. 120-131 (Year: 1996).*

Aasbakken et al, "Evaluation of User Engagement and Message Comprehension in a Pervasive Software Installation", IEEE, pp. 27-30 (Year: 2012).*

Treinen et al, "Expressing Advanced User Preferences in Component Installation", ACM, pp. 31-40 (Year: 2009).*

\* cited by examiner

| PATTERN | DEALER (SETUP-UNFINISHED STATUS) | END-USER (SETUP-FINISHED STATUS) |
|---|---|---|
| P1 | NORMAL INSTALLATION | – |
| P2 | – | NORMAL INSTALLATION |
| P3 | HALF INSTALLATION | COMPLETION OF HALF INSTALLATION |

SOFTWARE INSTALLING AND UPDATING METHOD, AND PROCESS VIA COMMUNICATION INTERFACE

CROSS-REFERENCE TO RELATED APPLICATIONS

This application claims priority under 35 U.S.C. § 119 from Japanese Patent Application No. 2019-177273 filed on Sep. 27, 2019. The entire subject matter of the application is incorporated herein by reference.

BACKGROUND

Technical Field

The present disclosures relate to an information processing apparatus configured to obtain approval of a user when software is to be installed. The present disclosures are also relate to a software installing method applicable to such an information processing apparatus and a non-transitory computer-readable recording medium storing instructions realizing such a method.

Related Art

There has been known an information processing apparatus configured to obtain approval of a user before installing software thereon. In one conventional image forming apparatus, when firmware having an enhanced security performance has been installed therein and an update of the firmware is to be installed, the information processing apparatus checks whether approval of a user for installing the update is obtained by executing a user authentication process.

Typically, the image forming apparatus displays an authentication screen for prompting a user to input, for example, a user ID and a password to check authority of the user who instructs the update of the firmware. The image forming apparatus updates the firmware when success of the login authentication by the user having administrative authority is confirmed based on the input information on the authentication screen.

SUMMARY

According to the above-described image forming apparatus, since user authentication is required to install software, only software that has been approved by the user can be installed. Such a configuration prevents malicious software from being installed and enhances security. On the other hand, if the user's approval is required for every installation of software, usability in installing software is deteriorated.

According to aspects of the present disclosures, there is provided an information processing apparatus having a communication interface, a display device and a controller. The controller is configured to perform, in response to receipt of an installation request for installing of a software via the communication interface, determining whether the information processing apparatus is in a setup-finished status in which a certain setup has been done or in a setup-unfinished status in which the certain setup has not been done. The controller is configured to further perform displaying, on the display device, an approval screen prompting a user to approve or not to approve installation of the software when it is determined that the information processing apparatus is in the setup-finished status, and omitting the displaying of the approval screen when it is determined that the information processing apparatus is in the setup-unfinished status.

According to aspects of the present disclosures, there is provided a method of installing software on an information processing apparatus provided with a communication interface and a display device. The method including determining, in response to receipt of an installation request requesting for installation of a software via the communication interface, whether the information processing apparatus is in a setup-finished status in which a certain setup has been done or in a setup-unfinished status in which the certain setup has not been done, displaying, on the display device, an approval screen prompting a user to install or not to approve installation of the software when it is determined that the information processing apparatus is in the setup-finished status, and omitting displaying of the approval screen when it is determined that the information processing apparatus is in the setup-unfinished status.

According to aspects of the present disclosures, there is provided a non-transitory computer-readable storage medium for an information processing apparatus provided with a communication interface, a display device and a controller, the storage storing computer-executable instructions which cause, when executed by the controller, the information processing apparatus to perform, in response to receipt of an installation request for installing of a software via the communication interface, determining whether the information processing apparatus is in a setup-finished status in which a certain setup has been done or in a setup-unfinished status in which the certain setup has not been done, displaying, on the display device, an approval screen prompting a user to approve or not to approve installation of the software when it is determined that the information processing apparatus is in the setup-finished status, and omitting the displaying the approval screen when it is determined that the information processing apparatus is in the setup-unfinished status.

According to aspects of the present disclosures, there is provided an information processing apparatus having a communication interface, a user interface, and a controller. The controller is configured to perform, in response to receipt of a request for installation of software in the information processing apparatus via the communication interface, determining whether the information processing apparatus is in a first status or a second status. Further, when it is determined that information processing apparatus is in the first status, obtaining user approval of installation through the user interface and installing the software in accordance with the request for installation when the user approval is obtained, and when it is determined that the information processing apparatus is in the second status, installing the software in accordance with the request for installation without obtaining the user approval through the user interface.

BRIEF DESCRIPTION OF THE ACCOMPANYING DRAWINGS

DETAILED DESCRIPTION OF EMBODIMENT

Hereinafter, referring to the accompanying drawings, an embodiment according to aspects of the present disclosures will be described. It should be noted that an embodiment described below is only an example according to aspects of the present disclosures. Various modifications and/of improvements of the embodiment can be made without departing from aspects of the present disclosures. For example, as a modification, an execution of order of processes, which will be described below, may be changed without departing aspects of the present disclosures.

The technique disclosed in this specification can be implemented in various forms, for example, a method of installing software on the information processing apparatus, a computer program used to implement functions of the information processing apparatus, or a computer-readable storage media storing the computer program.

Configuration of MFP

Figure 1:
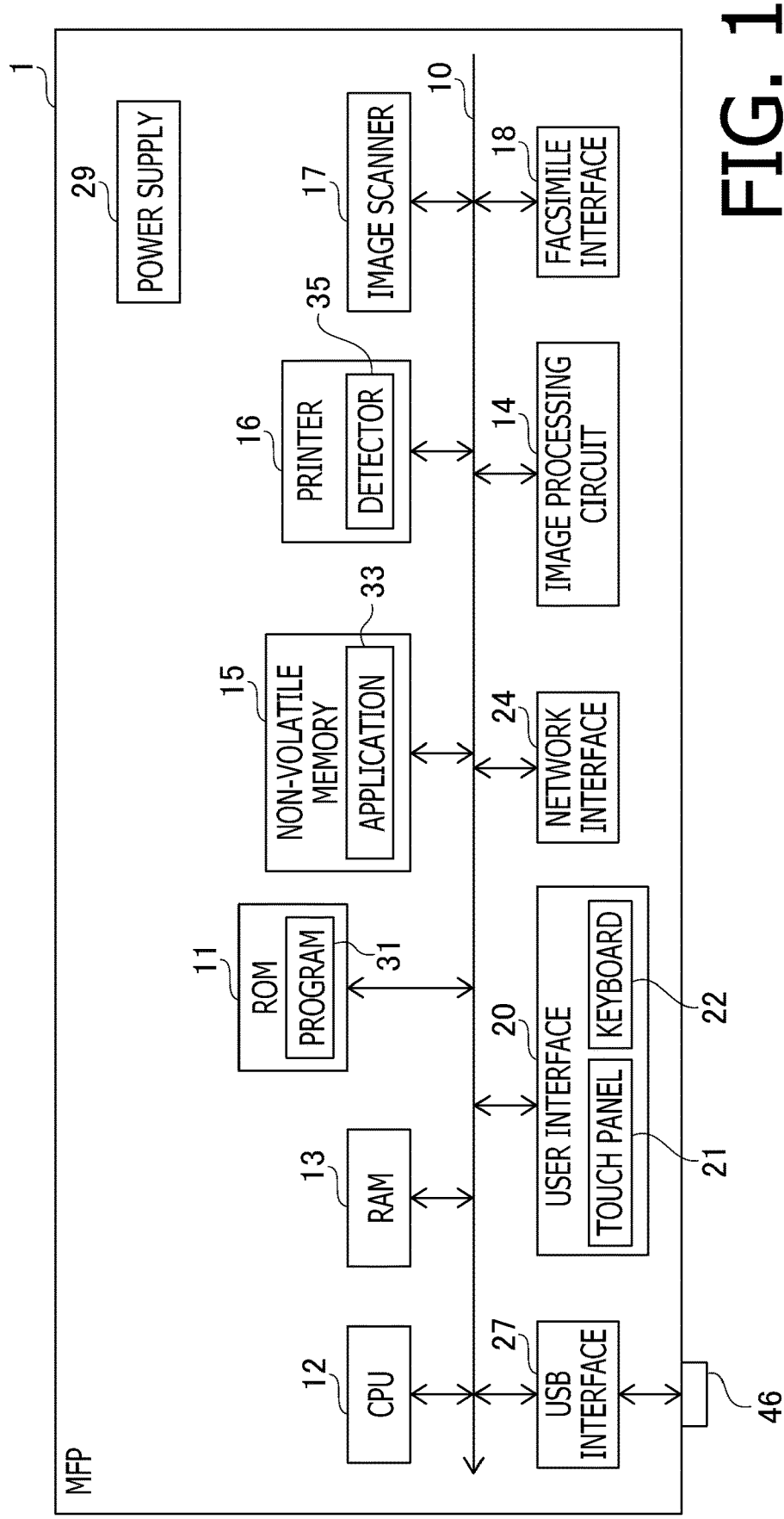
FIG. 1 is a block diagram showing an electrical configuration of an MFP according to aspects of the present disclosures.

FIG. 1 is a block diagram showing an electrical configuration of an MFP 1 which is an illustrative embodiment of an information processing apparatus according to the present disclosures. The MFP 1 has a plurality of functions such as a printing function, a copying function, a scanning function and a facsimile function. As shown in FIG. 1, the MFP 1 includes a ROM 11, a CPU 12, a RAM 13, an image processing circuit 14, a non-volatile memory 15, a printer 16, an image scanner 17, a facsimile interface 18, a user interface 20, a network interface 24 and a USB interface 27. These elements including the CPU 12 are interconnected via a bus 10. Further, the MFP 1 includes a power supply 29 configured to supply electricity supplied from a commercial power source to respective elements. The power supply 29 includes a power cable and a power circuits (e.g., a bridge diode and a smoothing circuit), and is configured to generate a DC power from the commercial power source, and supply the DC power to each element of the MFP 1 via a power line.

The ROM 11 stores various programs 31. For example, the program 31 is configured to integrally control the elements of the MFP 1. The CPU 12 controls the elements interconnected via the bus 10 by executing a program 31 which is loaded from the ROM 11 into the RAM 13 and temporarily stores processing results in the RAM 13. It is noted that a storage device storing the program 31 does not need to be limited to the ROM 11. Such a storage device may be, optionally or alternatively, an HDD, an NVRAM, a flash memory, or a combination of aforementioned storage devices.

The non-volatile memory 15 is a rewritable non-volatile memory configured to store and hold data. The non-volatile memory 15 may include an EEPROM, an NVRAMs, a flash memory and an HDD. The non-volatile memory 15 stores an application 33. The application 33, for example, realizes variety of services using basic functions provided by the program 31. The application 33, when executed by the CPU 12, controls a displaying process of a touch panel 21 based on the input operation on the touch panel 21 of a user interface 20 (described below). The application 33 is configured to send scan data scanned by the image scanner 17 to an external server. It is noted that, in the following description, the MFP 1 executing the program 31 or the application 33 may be referred to merely by a name of the apparatus. For example, an expression "the MFP 1 receives a user operation on a touch panel 21" may denote "the CPU 12 of the MFP 1 executes the control program 31 or the application 33 and controls the touch panel 21, thereby receiving a user operation to the touch panel 21."

The image processing circuit 14 is configured to process and extract image data related to a printing job or a scanning job. The printer 16 includes a print engine configured to form images represented by image data on a sheet (e.g. a piece of paper, an OHP sheet and the like). The print engine may be configured to execute printing in accordance with the well-known electro-photographic imaging technique and include an exposure unit, a photosensitive member (e.g., a photosensitive drum) and a toner cartridge. It is noted that the print engine is not necessarily limited to one in accordance with the electro-photographic imaging technique, but may be configured to execute printing, for example, in accordance with an inkjet printing technique using an inkjet printer head.

The printer 16 includes a detector 35 which detects whether the toner cartridge (not illustrated) is attached to the printer 16. The detector 35 outputs, to the CPU 12, a signal indicating placement of the toner cartridge to the printer 16. This allows the CPU 12 to detect initial placement of the toner cartridge to the MFP 1, or to detect replacement of the toner cartridge. A cartridge placement flag is stored, for example, in the non-volatile memory 15. A default value of the cartridge placement flag is set to a value indicating no cartridge has ever been attached to the printer 16. When attachment of the toner cartridge to the printer 16 is detected by the detector 35 first time, the CPU 12 changes the cartridge placement flag in the non-volatile memory 15 to another value indicating that the toner cartridge has been attached to the printer 16. Thus, when receiving the signal indicating attachment of a cartridge to the printer 16 from the detector 35, the CPU 12 is capable of distinguishing the initial placement of the toner cartridge from the replacement of the toner cartridge by referring to the cartridge replacement flag. In other words, the CPU 12 is capable of whether the current status of the MFP 1 is "before" or "after" the initial placement of the toner cartridge based on the placement flag stored in the non-volatile memory 15.

The detector 35 may detect the placement of the toner cartridge in a mechanical manner with use of, for example, a relay switch. Alternatively, the detector 35 may detect the placement of a new toner cartridge by reading an IC chip mounted on the toner cartridge. In addition, the detector 35 may detect the placement of a cartridge in a similar manner if the printer 16 uses a technique other than the electro-photographic imaging technique, e.g. the inkjet printing technique. For example, the detector 35 may detect the placement of an ink cartridge in accordance with a mechanical way using the relay switch, or an electrical way using the IC chip.

The image scanner 17 includes a read sensor which is configured to read an image on an original document. As the read sensor, a CCD, a CIS, or another kind of device can be used. The image scanner 17 is configured to cause the read sensor to move relative to the original document placed on a scanner bed, cause the read sensor to read an image on the original document, and generate image data representing the read image. The facsimile interface 18 is configured to transmit and receive facsimile data to and from another facsimile device over a telephone line.

The user interface 20 includes the touch panel 21 and/or a keyboard 22. The touch panel 21 may include, for example, a liquid crystal panel, a light source such as LEDs which emit light from backside of the liquid crystal panel, and a touch sensing film attached on a surface of the liquid crystal panel. The keyboard 22 has a plurality of operation buttons. The user interface 20 is configured to display, on the touch panel 21, various setting screens and operating statuses under control of the CPU 12. In addition, the user interface 20 transmits, to the CPU 12, a signal corresponding to an input operation to the touch panel 21 or the keyboard 22. In the present embodiment, the MFP 1 is provided with a touch panel 21 which has a combination of the display unit and the operating unit, but the present disclosures do not need to be limited to the configuration of this example. For example, mechanical keys may be provided as the operating unit in addition to the display unit.

The network interface 24 may include a LAN interface, and is connectable to an external device (e.g., a router or a PC) via a LAN cable (not illustrated). The MFP 1 executes printing, scanning or sending facsimile based on a job (e.g. printing job) received from the external device through the network interface 24. It is noted that the way for connecting the MFP 1 to the external device does not need to be limited to the wired LAN, but a wireless LAN, for example, can also be used.

The USB interface 27 may include an interface for communicating or supplying/receiving electric power based on the USB (Universal Serial Bus) standard. The USB standard does not need to be limited to a particular one, and USB 2.0 standard or USB 3.0 standard may be used. Based on control of the CPU 12, the USB interface 27 executes inputting and outputting data between a USB instrument connected to a USB port 46.

Installation of Software

The MFP 1 in this present embodiment is configured to receive an installation request instructing installation of software through the network interface 24 or the USB interface 27, and executes installation of the software. In the present disclosures, the software is a program 31 that provides fundamental function of the MFP 1 (e.g. firmware), an application 33 that controls displaying and others of the touch panel 21, and the like. It is noted that the software in this application is not limited to the type set forth above, but may also include, for example, add-in software that adds functions to software, or an operating system which is used for an advanced control of the MFP 1. In the following description, an example in which an application 33 is adopted as such software will be described.

The MFP 1 receives data (installer, update program, data sets, etc.) of a new application 33 via the network interface 24 or the USB interface 27 in response to an installation request received over the network interface 24 or the USB interface 27. The MFP 1 executes an installation or an update of the application 33 based on the received data of the application 33. It is noted that a method of receiving the installation information or data of the application 33 does not need to be limited to the above-described method using the network interface 24 or the USB interface 27. The MFP 1 may include a communication interface according to another standard such as IEEE 1394 or the like as a communication interface which receives the installation request or the data of the application 33. In addition, the MFP 1 may be configured to receive the installation request or the data of the application 33 via a wireless communication device using NFC (Near Field Communication) or Bluetooth (registered trademark). For example, the MFP 1 may be configured to receive an installation request from a mobile terminal device via Bluetooth (registered trademark) interface, and thereafter receive data of a new application 33 from a server of a manufacturing company/vendor via the network interface 24.

Figure 2:
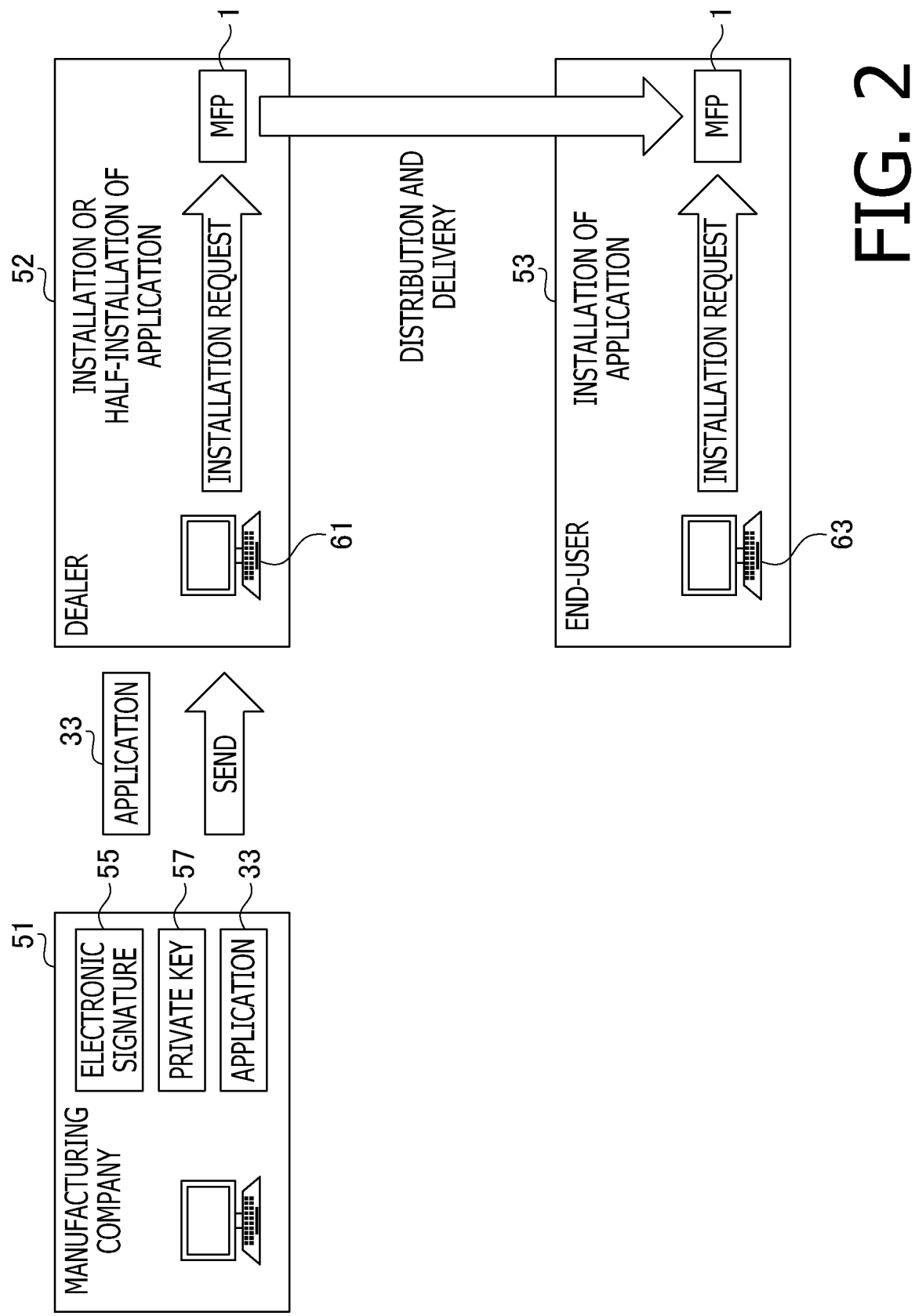
FIG. 2 shows aspects of installation of an application during distribution of the MFP.

FIG. 2 shows aspects of installation of the application 33 during distribution of the MFP 1. It is noted that FIG. 2 shows an example of the distribution process. As shown in FIG. 2, the MFPs 1 are manufactured by a manufacturing company 51, and distributed and delivered to an end-users 53 by a dealer 52. The application 33 can be produced by the manufacturing company 51 or the dealer 52 as a distributor, or another (third) party like a software development company.

The manufacturing company 51 prepares, for example, an electronic signature 55 and a private key 57 so as to certificate a vendor of the application 33. The manufacturing company 51 encrypts the application 33 using a public key or a private key 57 which is certified by the electronic signature 55, and put the encrypted application 33 and the electronic signature 55 available on the server. The MFP 1 executes the installation of the application 33 which is published on the server.

The dealer 52 sets up a plurality of MFPs 1 by installing the same application 33 to a plurality of MFPs 1 that will be delivered to the end-users 53. The dealer 52 uses a terminal device 61 (e.g., a PC or a mobile terminal device) in which a setup tool provided by the manufacturing company 51 is installed, and sends installation requests to the plurality of MFPs 1, thereby installing the application 33 to the plurality of MFPs 1 at one time. Each of the MFPs 1 is configured to download and install the application 33 which is published on the server in response to receipt of the installation request.

The installation includes processes of:
(1) downloading the application 33 and the electronic signature 55;
(2) verifying downloaded electronic signature 55;
(3) decrypting the application 33 using the private key 57; and
(4) developing the decrypted application 33 to the non-volatile memory 15 and setting a registry data.

It is noted that the processes (1) to (4) and contents thereof are only examples and can be suitably modified.

The MFP 1 executes all of the above-described processes (steps) (1) to (4), thereby setting an installation state of the application 33 into an installation completed status (hereinafter, referred to as a "completely-installed state"). When the application 33 in the "completely-installed state" is selected on the touch panel 21, the MFP 1 starts up the selected application 33 and displays a start-up screen on the touch panel 21.

It is noted that the MFP 1 can also set the application 33 in a "half-installed state." In the process of making the installation state of the application 33 in the "half-installed state," the MFP 1 may complete all the above-described processes (1) to (4), but store, in association with the application 33, a flag value indicating that the installation has not been completed in the non-volatile memory 15. The MFP 1 manages the applications 33 in the "completely-installed state" and the applications 33 in the "half-installed state" in a distinguished manner based on the flag value. Further, the MFP 1 monitors execution of the application 33 in the "half-installed state" when selected on the touch panel 21. Details of the execution process of the application 33 in the "completely-installed state" and the application 33 in the "half-installed state" will be described later.

It is noted that the "half-installed state" does not need to be limited to the above described state in which all the processes (1) to (4) have been completed but only the flag value indicating that the installation has not been finished is set. For example, the MFP 1 may terminate the installation process at any of processes (1) to (4) so that the installation of the application 33 has not been completed. The MFP 1 may be configured to manage the processing stage of the installation by using the flag value associated with the application 33. In this case, when execution of the application 33 which has not been completely installed is selected to start on the touch panel 21, the MFP 1 resumes the installation process (i.e., remaining steps to completely install the application 33 may be executed).

In the meantime, as shown in FIG. 2, the end-user 53 may install an application 33 to the MFP 1. When, for example, the end-user 53 wants to use an additional application 33 which is not included in the applications 33 having been installed by the dealer 52, the end-user 53 may wish to install the additional application 33 to the MFP 1. In such a case, as is done by the dealer 52, a system administrator of the end-user 53 uses a terminal device 63 in which a setup tool provided by the manufacturing company 51 is installed, sends installation requests to the plurality of MFPs 1, and install the application 33 to the plurality of MFPs 1 at one time. Regarding the half-installed application 33, installation thereof is completed by the MFP 1 when the end-user 53 operates the touch panel 21 and execute the same.

Normal Installation Process

Next, an installation process performed by the MFP 1 will be described with reference to FIGS. 3 to 9. In the following description, three installation patterns P1, P2 and P3 (see FIG. 3) to install the application 33 will be described.

According to the pattern P1, the dealer 52 (see FIG. 2) installs the application 33 in the "completely-installed state" (hereinafter, installation of the application 33 in the "completely-installed state" will be referred to as a "normal installation"). According to the pattern P2, the end-user 53 performs the normal installation of the application 33. According to the pattern P3, the dealer 52 installs the application 33 in the "half-installed state," while the end-user 53 completes the installation so that the application 33 is installed in the "completely-installed state."

It is noted that the pattern of installation of the application 33 does not need to be limited to the above-described three patterns P1 to P3. For example, the end-user 53 may execute the half installation process instead of the dealer 52. For example, when the MFP 1 is to be lent to another department, the end-user 53 may execute the half installation process using the terminal device 63. In this case, a user in the other department may complete the installation process. The MFP 1 in this embodiment is configured to execute processes illustrated in flowcharts shown in FIGS. 4, 5, 6, 10 and 12, in which whether or not the confirmation/verification process is to be performed in the installation process is determined depending on which of the patterns P1, P2 and P3 is selected.

Figures 3, 4:
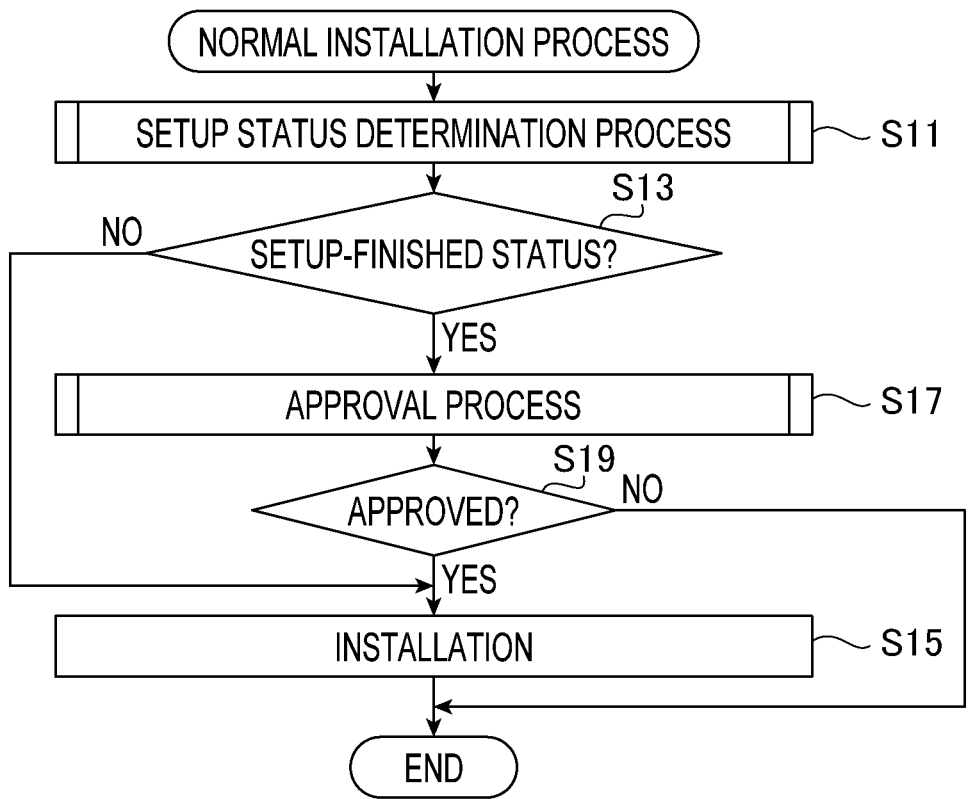
FIG. 3 shows an example of installation patterns of applications.
FIG. 4 is a flowchart illustrating an example of a normal installation process.
Figure 5:
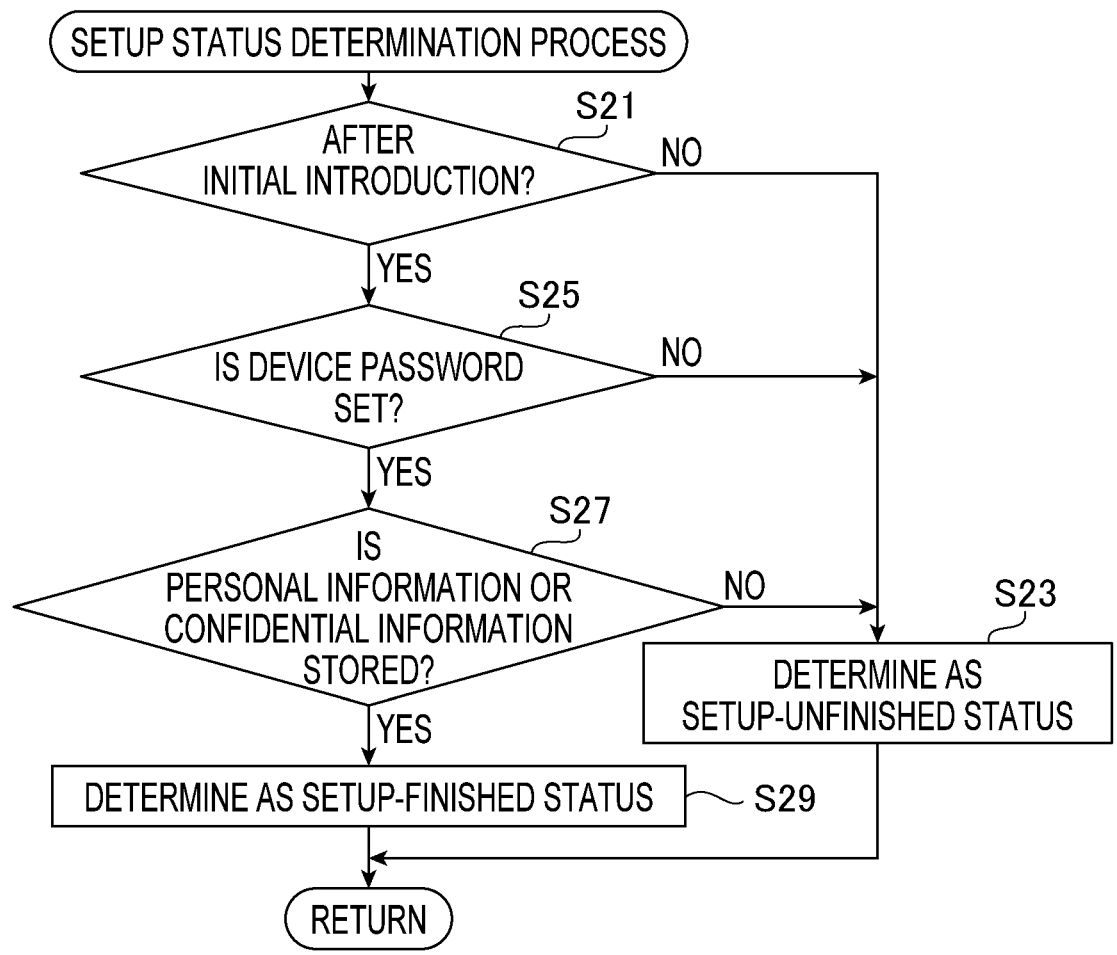
FIG. 5 is a flowchart illustrating an example of a setup status determination process.
Figure 6:
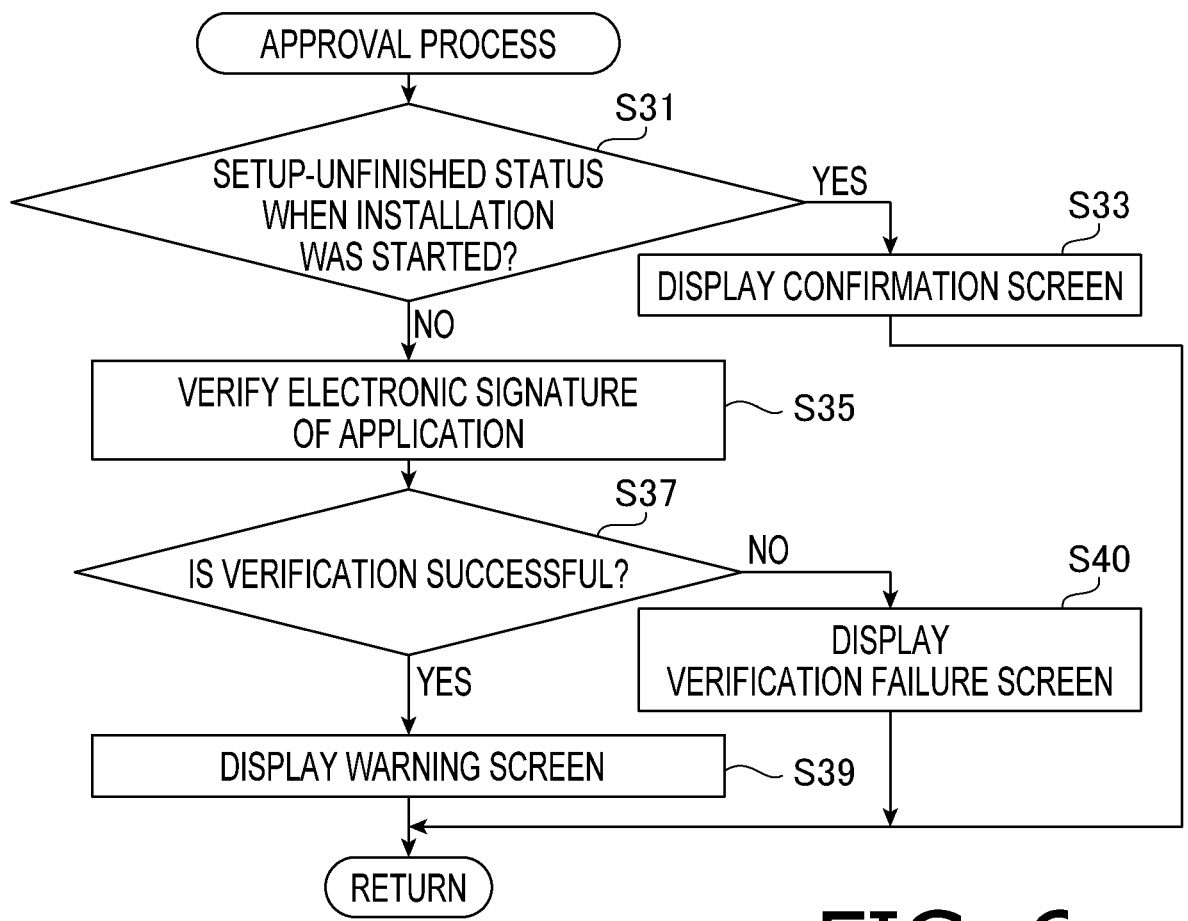
FIG. 6 is a flowchart illustrating an example of an approval process.

FIGS. 4 to 6 illustrate a normal installation process in which the normal installation is performed. According to the pattern P1, the dealer 52 operates the setting tool of the terminal device 61 (see FIG. 2) to determine which of the normal installation process and the half installation process is to be executed, and starts installing the application 33 in the MFP 1. The terminal device 61 sends, to the MFP 1, an installation request instructing execution of the normal installation or the half installation depending on the operation of the dealer 52. According to the pattern P2, the end-user 53 operates the setting tool of the terminal device 63 (see FIG. 2) to start the normal installation process to install the application 33 in the MFP 1. The terminal device 63 sends, to the MFP 1, an installation request instructing execution of the normal installation depending on the operation of the end-user 53.

The MFP 1 executes the normal installation process shown in FIGS. 4 to 6 when receiving the installation request of the normal installation from the terminal device 61 or 63 (according to the pattern P1 or P2). The MFP 1 executes the half installation process (which will be described later with reference to FIG. 10) when the MFP 1 receives an installation request of the half installation from the terminal device 61. It is noted that the above described method of sending the installation request is only an example. As an alternative, the dealer 52 may be configured to send (or input) such an installation request to the MFP 1 by connecting or inserting a USB memory into the USB port 46.

When, for example, the dealer 52 is supposed to distribute a plurality of MFPs 1 to the end-user 53, the dealer 52 installs the same application 33 to the plurality of MFPs 1 at one time. In such a case, if each of the MFPs 1 requires the approval of the installation, working efficiency of the dealer 52 will be seriously lowered and the usability will be impaired. At a using phase of the MFP 1 by the end-user 53, a system administrator or another user may additionally install a necessary application 33. In such a case, when an application of which a vendor is unknown is installed to the MFP 1, there could be a risk of information leakage or the like. Therefore, it is desirable that the MFP 1 requires the end-user 53 to approve installation of an application 33 when the MFP 1 is in use.

As shown in FIG. 4, the MFP 1 according to the present embodiment is configured to determine a status of the MFP 1 which is about to be firstly used as a setup-finished status, and display an approval screen prompting the end-user 53 to approve installation of the application 33. In contrast, the MFP 1 is configured to determine a status of the MFP 1 before the end-user 53 starts using the MFP 1 (e.g. at a timing when the dealer 52 installs the application 33) as a setup-unfinished status, and omit the process of displaying the approval screen. It is noted that, as will be described later, the expression "to omit the process of displaying the approval screen" means not only to omit the process of displaying the approval screen, but may include displaying of another screen such as a confirmation screen, a caution screen, or a verification screen, instead of the approval screen.

It is noted that the flowcharts show processes performed by the CPU 12 following instructions described in the program 31. Thus, in the description in the present specification, each of the processes (e.g. "receive," "determine," "install," "setup," and so on) represents a process performed by the CPU 12. It is noted that processes performed by the CPU 12 include a hardware control.

When the CPU 12 receives the installation request for the normal installation via the network interface 24, the CPU 12 executes a setup status determination process in which the CPU 12 determines whether the setup has already been finished or unfinished (S11).

FIG. 5 shows details of the setup status determination process. After starting the setup status determination process shown in FIG. 5, the CPU 12 determines whether an initial introduction of the MFP 1 has already been done (S21). It is likely that the dealer 52, who installs the application 33 does not attach the toner cartridge to the printer 16, while it is likely that the end-user 53 attaches the toner cartridge when printing is actually performed. Therefore, according to the embodiment, the CPU 12 is configured to determine whether the current status is before or after the initial introduction of the MFP 1 based on whether the toner cartridge has never been attached to the printer 16 or has ever been attached to the printer 16.

Specifically, the CPU 12 determines that the current status of the MFP 1 is before the initial introduction which is the status during a period after the MFP 1 was manufactured by the manufacturing company 51 and before the toner cartridge is firstly attached to the printer 16. On the other hand, the CPU 12 determines that the current status of the MFP 1 is after the initial introduction which is the status after the toner cartridge has been firstly attached to the printer 16.

In S21, the CPU 12 determines whether the current status of the MFP 1 is before or after the initial introduction based on the flag stored in the non-volatile memory 15 and the detection signal of the detector 35 of the printer (see FIG. 1). When the flag stored in the non-volatile memory 15 indicates that the status of the MFP 1 is before the initial introduction and the detection signal of the detector 35 indicates that the toner cartridge is not attached to the printer 16, the CPU 12 determines that the current status of the MFP 1 is before the initial introduction (S21: NO) and the CPU 12 proceeds to S23.

In S23, the CPU 12 determines, as a result of the setup status determination process, that the MFP 1 is in the setup-unfinished status. Then, the CPU 12 stores a flag having a value indicating that the result of the setup status determination process is the "setup-unfinished status." After execution of S23, the CPU 12 terminates the setup status determination process shown in FIG. 5.

It is noted that the determination condition for determining whether the status of the MFP 1 is before or after the initial introduction does not need to be limited to determination of whether the toner cartridge has ever been attached or not. For example, the CPU 12 may be configured to monitor printing of a sheet and determine that the status of the MFP 1 is before the initial introduction during a period after the MFP 1 was manufactured and before printing of the first sheet is performed. Alternatively, the CPU 12 may determine whether the status of the MFP 1 is before or after the initial introduction based on setting information set by the user. It is noted that the term "setting information set by the user" includes, for example, the setting information necessary for the user to operate the MFP 1 such as language setting information defining a language used for displaying a text on the touch panel 21 and/or clock setting information. Optionally, the setting information set by the user may be information confirming user's approval to collect information regarding errors occurred during usage of the MFP 1 and send the same to the manufacturing company 51 for improvement in support/maintenance services.

When, for example, the toner cartridge is attached to the printer 16 for the first time and the MFP 1 is powered on, the CPU 12 may display a setting screen, through which the setting information is input by the end-user 53, on the touch panel 21. In this case, the MFP 1 may determine that the status of the MFP 1 is before the initial introduction (S21: NO) until all the setting items are set. That is, the CPU 12 may determine that the MFP 1 is in the setup-unfinished status until the necessary setting is completed. Alternatively or optionally, the CPU 12 may determine whether the status of the MFP 1 is before or after the initial introduction based on a combination of the conditions regarding first attachment of the toner cartridge, the condition regarding the completion of initial setting by the user and the condition regarding storage of personal information and/or confidential information.

When it is determined that the toner cartridge has ever been attached to the MFP 1 (S21: YES), the CPU 12 executes S25. In S25, the CPU 12 determines whether a device password is set. The device password is, for example, an administrator password with which the CPU 12 confirms that a user has the administrative authority of the MFP 1. It is highly possible that the device password such as the administrator password is set by the end-user 53 who actually uses the MFP 1. In other words, it is highly likely that the MFP 1 is set up by the dealer 52 until the device password is set. Therefore, when the CPU 12 determines that the device password has not yet been set (S25: NO), the CPU 12 determines that the status of the MFP 1 is the setup-unfinished status (S23). On the other hand, when the CPU 12 determines that the device password has already been set (S25: YES), the CPU 12 proceeds to S27.

It is noted that a method of setting the device password or a method of determining whether the setting is completed does not need to be limited to the above methods. For example, the MFP 1 may be configured to execute an EWS (Embedded Web Server) program which causes, when executed by the CPU 12, the MFP 1 to perform as a Web server, thereby the MFP 1 receiving the setting of the device password through the Web page. Then, the CPU 12 stores the device password received through the Web page in the non-volatile memory 15. According to such a configuration, the CPU 12 determines that the device password has already been set (S25: YES) until the device password is stored to the non-volatile memory 15, while the CPU 12 determines that the device password has not yet been set (S25: NO) when the device password has already been stored in the non-volatile memory 15.

In S27, the CPU 12 determines whether personal information or confidential information is stored in the MFP 1 (e.g., in the non-volatile memory 15). The personal information is, for example, a telephone directory, a scanning profile, or a registration information of shortcut buttons.

The telephone directory is information about telephone numbers, names and addresses representing transmission destinations of facsimile data or scan data. The scanning profile is the setting information for the image scanner 17 when an image is scanned, and includes, for example, information on an image resolution and the number of colors of the scan data. The registration information of shortcut buttons is information on speed buttons used for transmitting the facsimile data or scan data to particular destinations, respectively.

The confidential information is information that could be confidential for the business of the end-user 53 and includes, for example, print job information instructing the MFP 1 to perform printing, scan data, or facsimile data. When such personal information or confidential information is stored in the non-volatile memory 15 or the like, it is highly likely that the MFP 1 has already been used by the end-user 53. Hence, when none of the personal information and the confidential information is stored in the non-volatile memory 15 (S27: NO), the CPU 12 determines the current status of the MFP 1 is the setup-unfinished status (S23). When at least one of the personal information and the confidential information is stored in the non-volatile memory 15 (S27: YES), the CPU 12 determines that the current status of the MFP 1 is the setup-finished status (S29). In S29, the CPU 12 stores, in the RAM 13, a flag value indicating that the CPU 12 has determined that the status of the MFP 1 is the setup-finished status, and terminates the process shown in FIG. 5.

Returning to FIG. 4, the CPU 12 determines, in S13, whether the MFP 1 is in the setup-finished status or in the setup-unfinished status based on the processing result of S11. The CPU 12 determines whether the setup status is finished or unfinished by reading out from the RAM 13 the flag value set in S23 or S29 shown in FIG. 5. When the CPU 12 determines that the status of the MFP 1 is the setup-unfinished status (S13: NO), the CPU 12 installs, in S15, the application 33 for which the installation request is received. After executing S15, the CPU 12 terminates the process shown in FIG. 4.

Figure 7:
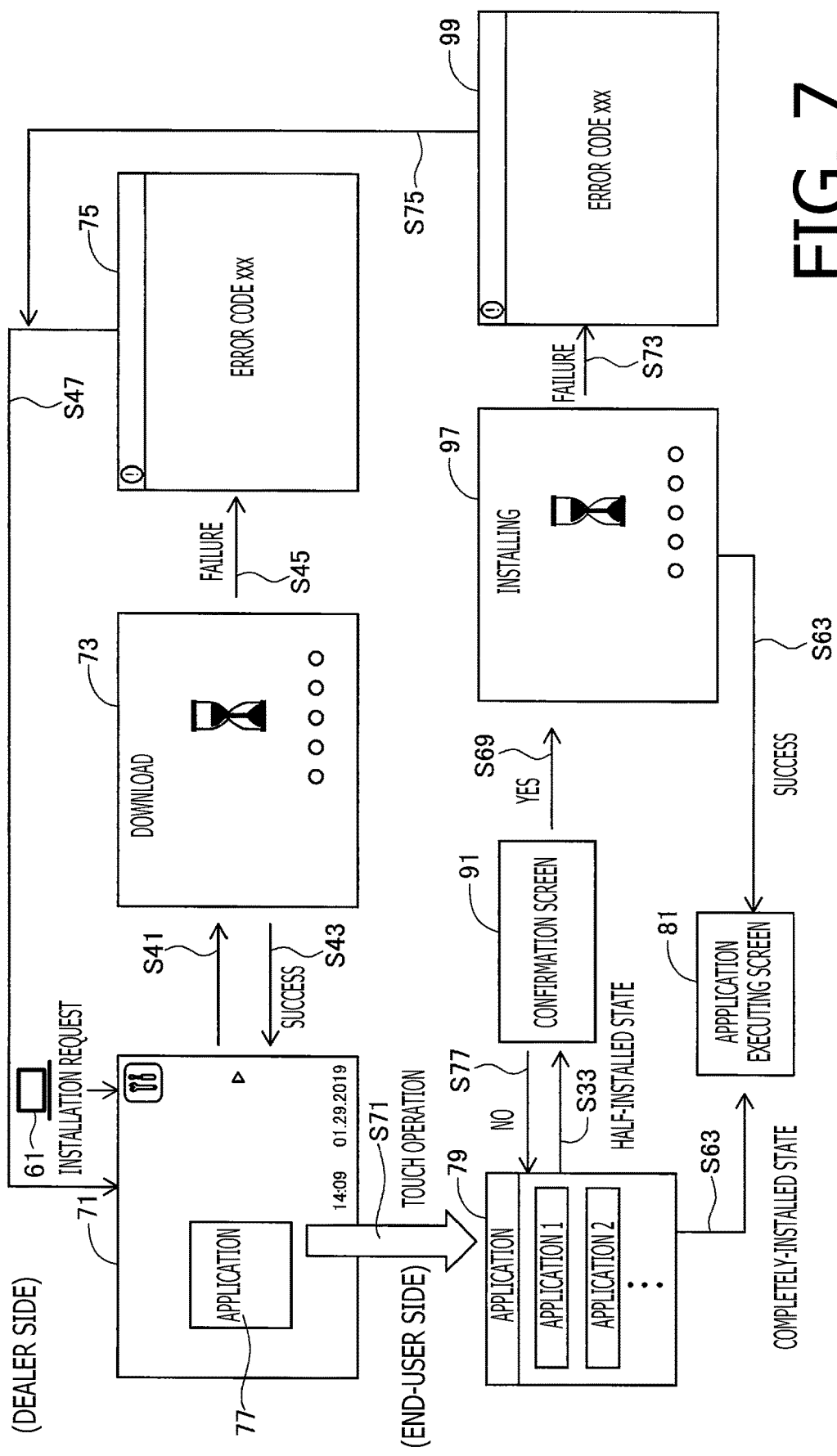
FIG. 7 shows transition of contents displayed on a touch panel during an installation process.

FIG. 7 illustrates transition of contents displayed on the touch panel 21 during both the normal installation process and the half installation process, which will be described below. An upper part of the transition diagram in FIG. 7 illustrates displaying of contents in response to the operation of the dealer 52. A lower part of the transition diagram in FIG. 7 illustrates displaying of contents in response to the operation of the end-user 53. It is noted that the contents to be displayed and/or the order of the transition shown in FIG. 7 is only an example.

When the MFP 1 is powered on, the CPU 12 displays a standby screen 71, which is indicated in upper left area of FIG. 7, on the touch panel 21. The CPU 12 starts the process shown in FIG. 4 in response to the CPU 12 receiving the installation request from the terminal device 61 of the dealer 52 when the standby screen 71 is being displayed. According to the pattern P1 shown in FIG. 3, the dealer 52 executes the normal installation of the application 33 when the MFP 1 is in the setup-unfinished status. In this case, the CPU 12 determines that the MFP 1 is in the setup-unfinished status in the setup status determination process shown in FIG. 5, and starts installing the application 33 in S15 in FIG. 4. In this case, the CPU 12 starts the installation (S41 in FIG. 7) without displaying (i.e., with omitting the displaying process of) an approval screen (see FIG. 8 and FIG. 9) through which the user inputs approval of installation.

As shown in FIG. 7, the CPU 12 indicates that the application 33 is downloaded from the server of the manufacturing company 51 and is being installed on the installing screen 73 which is displayed on the touch panel 21, and installs the application 33. After the installation is successfully completed, the CPU 12 switches the screen displayed on the touch panel 21 back to the standby screen 71 (S43 in FIG. 7). In this way, the installation can be performed with omitting the approval by the dealer 52 when the MFP 1 is in the setup-unfinished status. Accordingly, when the dealer 52 needs to install the application 33 to a plurality of the MFPs 1 at one time, the dealer 52 can complete the installation only by sending an installation request to each of the plurality of MFPs 1 from the terminal device 61. Thus, the setup operation for the plurality of MFPs 1 can be performed very efficiently.

The CPU 12 is configured to display an error screen 75 when the installation fails due to occurrence of an error during the installation (S45). The CPU 12 displays an error code on the error screen 75 as information regarding the failure of the installation. When receiving an input operation on the touch panel 21 after displaying the error screen 75, the CPU 12 displays the standby screen 71 on the touch panel 21 (S47).

Meanwhile, when the CPU 12 determines that the MFP 1 is in the setup-finished status (S13: YES) based on the results of the setup status determination process (FIG. 5), the CPU 12 proceeds to an approval process (S17). For example, according to the pattern P2 shown in FIG. 3, the end-user 53 executes the installation of the application 33 when the MFP 1 is in the setup-finished status.

FIG. 6 is a flowchart illustrating details of the approval process. The CPU 12 displays appropriate screens depending on whether the setup status is the setup-unfinished status or the setup-finished status by executing the approval process shown in FIG. 6.

First, in S31, the CPU 12 determines whether the MFP 1 was in the setup-unfinished status at a time when the installation of the application 33 was started. When the CPU 12 determines that the MFP 1 was in the setup-unfinished status (S31: YES), the CPU 12 executes S33. When the CPU 12 determines that the MFP 1 was in the setup-finished status (S31: NO), the CPU 12 executes S35. The CPU 12 is configured, for example, to store, in the non-volatile memory 15, the determining result of the setup status determination process, which performed in S11 in FIG. 4, in association with the application 33 to be installed, and the CPU 12 determines, based on the determining result, whether the status of the MFP 1 was before or after the setup status when the installation of the application 33 has started (i.e., whether the MFP 1 was in the setup-unfinished status or the setup-finished status).

It is noted that, since the normal installation process and the half installation process use the approval process shown in FIG. 6 as a common subprogram, the setup status of the MFP 1 is determined again in S31 in FIG. 6. It is noted that the above configuration may be modified so that the approval process for the normal installation process and the approval process for the half installation process may be different programs. In such a case, the approval process for the normal installation process may be modified such that the process starts from S35 (i.e., after the status of the MFP 1 is determined as the setup-finished status) without executing S31.

Since the pattern P2 (see FIG. 3) corresponds to the setup-finished status, the CPU 12 makes a negative decision in S31 (S31: NO) and then executes S35. In S35, the CPU 12 verifies the electronic signature 55 of the application 33 to be installed. Among applications 33 which can be installed in the MFP 1, some have electronic signatures 55 and are proved to be provided by reliable vendors, while some have no electronic signatures 55. Further among the electronic signatures 55, some are certified by official certificate authorities such as a root certificate authority or an intermediate certificate authority which is certified by the root certificate authority, and some are certified by private certificate authorities such as one having its own administration standard decided by a company or an individual. The MFP 1 according to the embodiment is configured to selectively import the electronic signature 55 (e.g., a public key certificate) that is certified by, for example, a manufacturing company 51, the dealer 52, or a system administrator of the end-user 53. For example, the dealer 52 may import, in advance, to the MFP 1, the electronic signature 55 of the manufacturing company 51 and/or the electronic signature 55 of the reliable vendor that provides an application 33. In S35 in FIG. 6, the CPU 12 executes a verification of the electronic signature 55 of the application 33 based on the preliminarily imported electronic signature 55.

It is noted that the method of verifying the electronic signature 55 is not limited to the above-described method of using the electronic signature 55 preliminarily imported by the dealer 52. For example, it is also possible that the CPU 12 downloads an officially certified electronic signature 55 from a root certificate authority via the network interface 24, and the CPU 12 may verify the electronic signature 55 attached to the application 33 using the downloaded electronic signature 55.

In S35, the CPU 12 verifies the electronic signature 55 distributed with the application 33 based on the preliminarily imported electronic signature 55. Next, in S37, the CPU 12 determines whether the verification in S35 is successful. The CPU 12 executes S39 when the verification of the electronic signature 55 is determined to be successful (S37: YES). For example, the CPU 12 executes S39 when the application 33 is certified, with use of an electronic signature 55 preliminarily imported from the dealer 52, as one being provided by the reliable vendor. On the other hand, the CPU 12 executes S40 when the verification of the electronic signature 55 is failed (S37: NO).

For example, the CPU 12 will execute S40 if the application 33 has no electronic signature 55 or if the application 33 has an electronic signature 55 that is certified by a private certificate authority (an electronic signature 55 other than the imported electronic signature 55 from the dealer 52).

Figure 8:
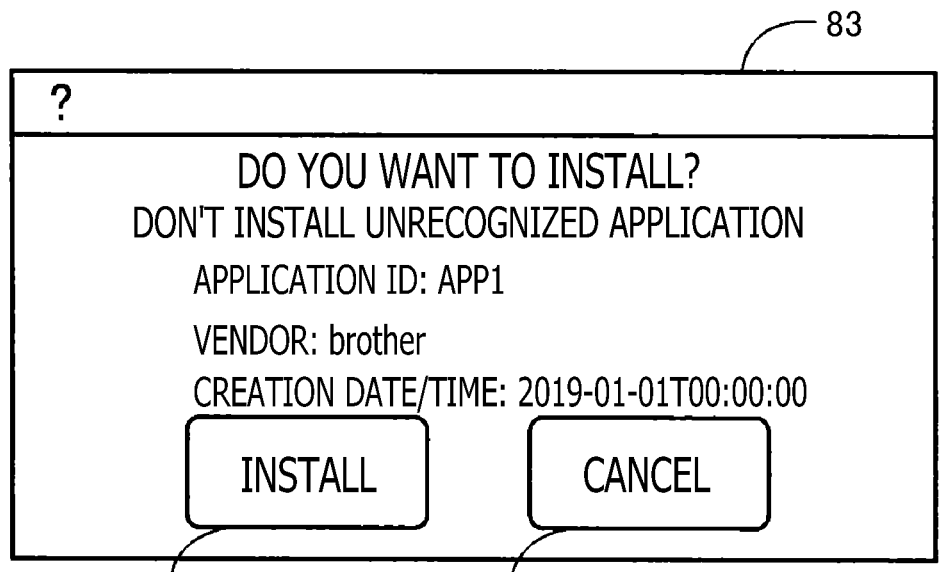
FIG. 8 is an example of a caution screen.

In S39, the CPU 12 displays the caution screen 83 shown in FIG. 8 on the touch panel 21 as an approval screen for the installation. As shown in FIG. 8, the CPU 12 displays, on the caution screen 83, a message to ask the end-user 53 whether to start the installation or a warning message "Do not install an unrecognized application" or the like. In addition, the CPU 12 displays, as reference information of the application 33, an ID of the application 33, vendor of the application 33, and/or creation date/time of the application 33. Furthermore, the CPU 12 displays an install button 85 to approve installation and a cancel button 86 to cancel installation on the caution screen 83. In the case of the pattern P2, the end-user 53 can decide whether or not to install the application 53 after checking the contents of the caution screen 83, and considering security risks of the application 33 to be installed.

Figure 9:
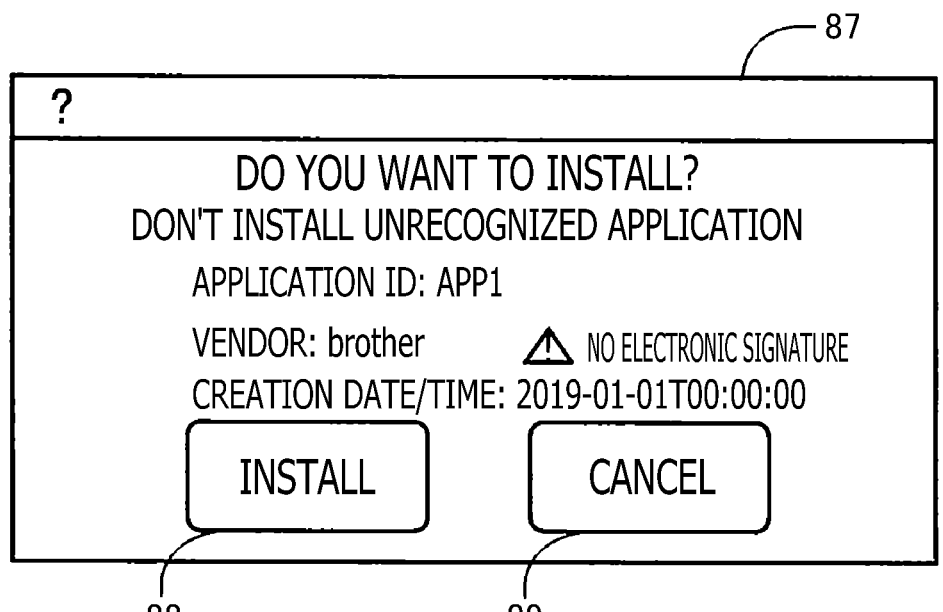
FIG. 9 is an example of a warning screen.

In S40, the CPU 12 displays the warning screen 87 shown in FIG. 9 on the touch panel 21 as an approval screen for the installation. As shown in FIG. 9 similarly to the caution screen 83, the CPU 12 displays, on the warning screen 87, a message to start installation, a warning message, and/or an ID of the application 33. In addition, the CPU 12 displays, on the warning screen 87, a message indicating that the verification of the electronic signature 55 is failed. When the electronic signature is not attached to the application 33, the CPU 12 displays a message "Electronic Signature is Unavailable" as shown in FIG. 9. When the electronic signature 55 is attached to the application, but verification using the electronic signature 55 which has been imported by the dealer 52 is failed, the CPU 12 may display a message "Verification of Electronic Signature Failed."

In the meantime, on the warning screen 87, the CPU 12 displays an install button 88 and a cancel button 89 which are similar to those displayed on the caution screen 83. Thus, the end-user 53 can recognize a possible risk that an application 33 which is not attached with an electronic signature 55 or is not approved by the dealer 52 to install (e.g. no operation guarantee) may be installed. Thus, the end-user 53 can determine whether or not to execute installation with recognizing that the security risk is high. After executing S39 or S40, the CPU 12 terminates the process shown in FIG. 6.

After executing S17 in FIG. 4, in S19, the CPU 12 detects whether the end-user 53 operates the install button (85, 88) or the cancel button (86, 89) to determine whether the installation of the application 33 is approved by the end-user 53. When the install button 85 is touched on the caution screen 83 or when the install button 88 is touched on the warning screen 87, the CPU 12 determines that the installation is approved (S19: YES), and the CPU 12 executes S15. That is, the CPU 12 executes S15 as the end-user 53 has approved installation of the application 33. As above, when the MFP 1 is in the setup-finished status, the installation can be executed with confirming that the end-user 53 has approved installation of the application 33.

If the cancel button 86 is selected on the caution screen 83 displayed in S39 or if the cancel button 89 is selected on the warning screen 87 displayed in S40, then the CPU 12 makes a negative decision in S19 (S19: NO) and terminates the normal installation process shown in FIG. 4. In this case, the CPU 12 terminates the installation process because the approval of the installation was not obtained from the end-user 53. In this case, the CPU 12 deletes data of the application 33. In this way, the end-user 53 can cancel the installation with checking the security risk on the approval screen (the caution screen 83 or the warning screen 87). Thus, it can be possible to prevent the installation of the malicious application 33, and thereby reducing the leakage of information.

Half Installation Process

Subsequently, an executing process of a half installation will be described with reference to FIG. 10. As an example of executing the half installation, such case may be included that, as shown in the pattern P3 in FIG. 3, the dealer 52 executes the half installation first and then the end-user 53 completes the rest of the installation. For example, the dealer 52 may send an installation request that instructs the half installation to the MFP 1 by operating the setup tool in the terminal device 61 (see FIG. 2). When receiving the installation request of the half installation, the CPU 12 of the MFP 1 starts the Half Installation process shown in FIG. 10. In the following description, substantially the same processing as exemplified in the aforementioned Normal Installation process as shown in FIG. 4 may be provided with the same reference characters as used in the embodiment of the Normal Installation process, and explanations of the same processing may be omitted.

Figure 10:
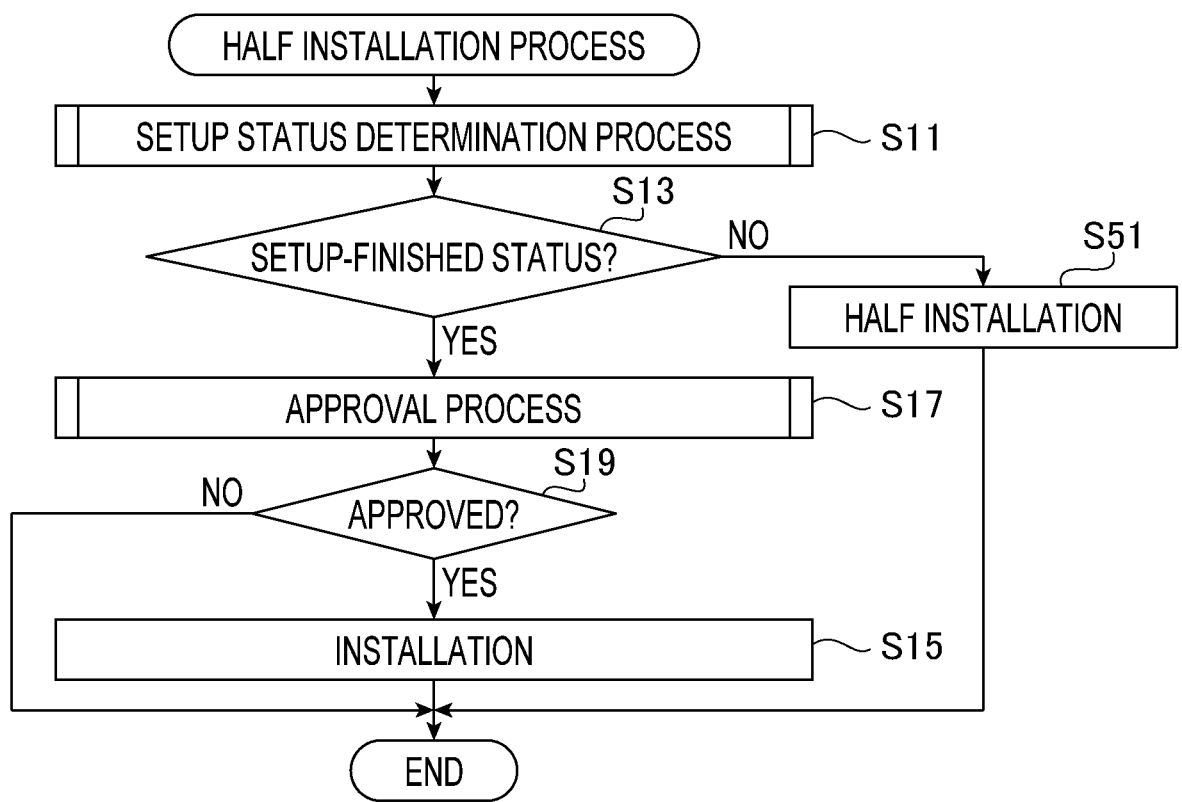
FIG. 10 is a flowchart illustrating a detailed example of a half installation process.

The CPU 12 executes the setup status determination process in S11 in FIG. 10 (see FIG. 5), and then determines the result of the determination process in S13. If the dealer 52 executes the half installation operation as in the pattern P3, the CPU 12 determines as the setup-unfinished status in S11 because such conditions that the toner cartridge has not yet placed are met. Meanwhile, if the dealer 52 or the end-user 53 executes the Half Installation process after placing the toner cartridge or setting the device password, then the CPU 12 determines as the setup-finished status in S11.

If the CPU 12 determines as the setup-finished status in the Half Installation process, then the CPU 12 executes the installation with checking the approval (S17, S19, S15). In the meantime, if the CPU 12 determines as the setup-unfinished status (S13:NO), the CPU 12 executes the Half Installation process of the application 33 (S51). For example, after completing all of the above-described processes (steps) (1) to (4), the CPU 12 stores a flag value which indicates as the "half-installed state" in relation to the application 33 into the non-volatile memory 15. After executing S51, the CPU 12 terminates the process as shown in FIG. 10. In this way, the application 33 is half-installed to the MFP 1.

Executing Process of an Application Software

Figure 12:
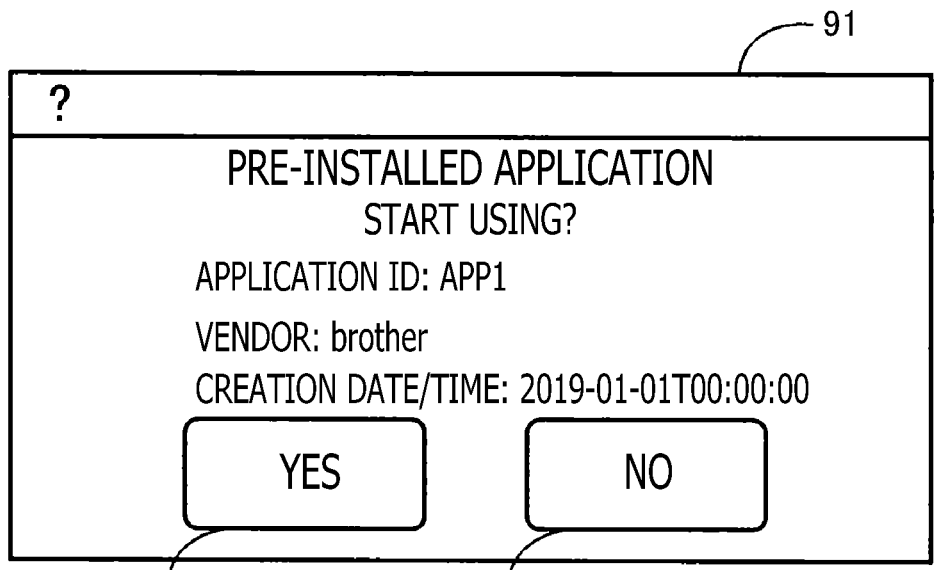
FIG. 12 is an example of a confirmation screen.
Figure 13:
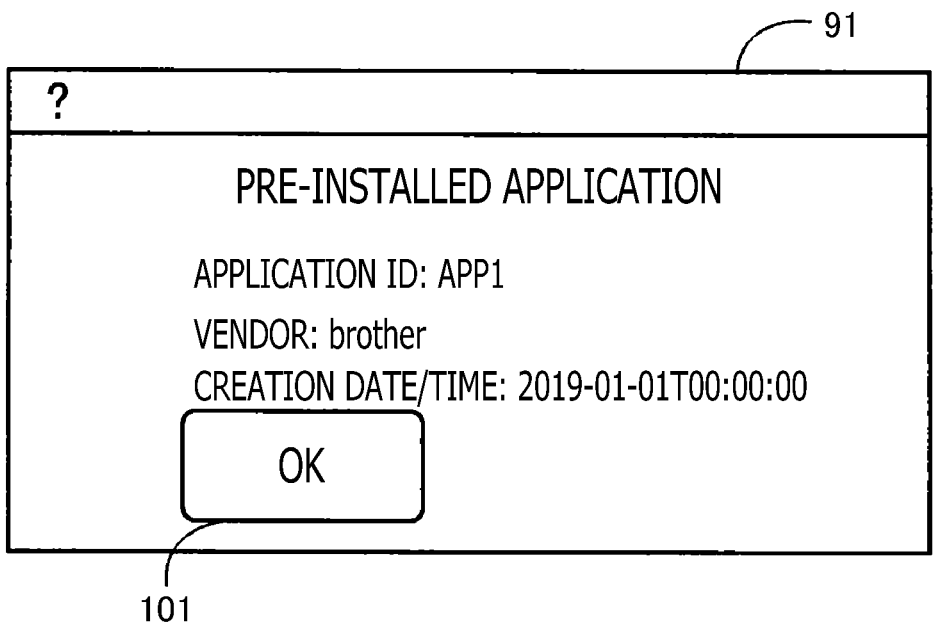
FIG. 13 is another example of the confirmation screen.

Subsequently, an executing process of an application 33 of which installation state on the MFP 1 is normal-installed state or half-installed state will be described with reference to FIGS. 11 to 13. According to the present disclosures, it is assumed that the MFP 1 is delivered to the end-user 53 from the dealer 52 such that the application 33 is installed in the MFP 1 in the normal-installed state or the half-installed state. The CPU 12 displays a standby screen 71 shown in FIG. 7 when the MFP 1 is powered on. For example, the CPU 12 starts the executing process of an application software shown in FIG. 11 after displaying the standby screen 71.

When an application icon 77 displayed on the standby screen 71 is operated on the touch panel, the CPU 12 displays a selection screen 79 on which application software will be selected (S71 in FIG. 7). The CPU 12 displays a list of names of normal-installed application 33 and/or half-installed application 33 on the selection screen 79.

Figure 11:
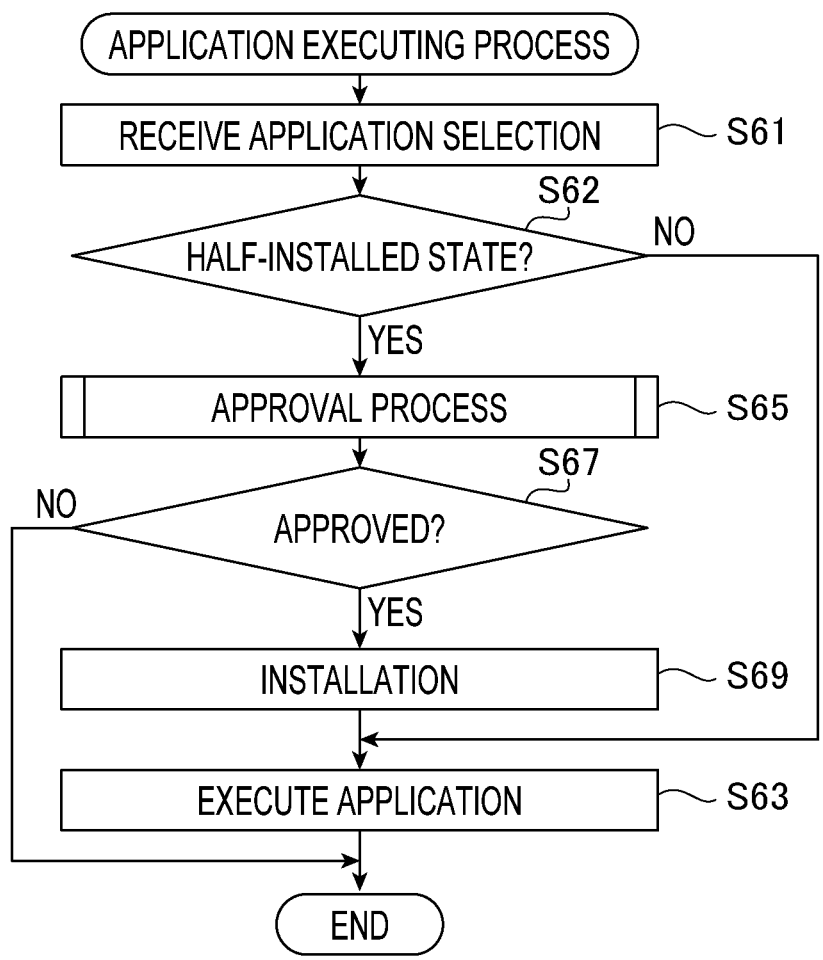
FIG. 11 is a flowchart illustrating an application executing process.

After starting the process shown in FIG. 11, the CPU 12 pauses to wait for selection of the application 33 on the selection screen 79 (S61). When any one of the applications 33 displayed on the selection screen 79 is operated (selected) on the touch panel, the CPU 12 determines whether the operated application 33 is in the "half-installed state" or not in S62. It is noted that the CPU 12 determines whether or not the application 33 is in the "half-installed state" based on the flag value associated with the application 33.

When the normal-installed application 33 (which is in the "completely-installed state") is selected on the selection screen 79 (S62: NO), the CPU 12 executes the application 33 which is in the "completely-installed state" (S63). The CPU 12 displays an executing screen 81 of the application 33 by starting the application 33 (see FIG. 7). The CPU 12 terminates the process shown in FIG. 11 after executing S63. In this way, when the application 33 has been already installed and the MFP 1 is in the setup-unfinished status, it is possible to start the application 33 only by selecting the same on the selection screen 79 (without obtaining the installation approval by the end-user 53).

On the other hand, when the half-installed application 33 is selected on the selection screen 79 (S62: YES), the CPU 12 executes the approval process (S65) shown in FIG. 6. In S31, the CPU 12 determines whether the MFP 1 was in the setup-unfinished status at a time when the installation of the application 33, which was selected to be executed, was started. The installation state of the selected application 33 was the "half-installed state." Therefore, the MFP 1 was in the setup-unfinished status at the time when the installation of the application 33 was started. For example, the CPU 12 determines that the installation state of the application 33 is the setup-unfinished status based on the flag value set in S23 (see FIG. 5) of the Half Installation process described above.

When the CPU 12 makes an affirmative decision in S31 in FIG. 6 (S31: YES), the CPU 12 executes S33. The CPU 12 displays the confirmation screen 91 shown in FIG. 12 on the touch panel 21 (S33). As shown in FIG. 12, the CPU 12 displays, on the confirmation screen 91, messages such as "Pre-installed Application" and/or "Start Using?" In this way, it is possible to notice to the end-user 53 that the application 33 that is to be executed was installed in the setup-unfinished status (i.e. in the "half-installed state").

In addition, the CPU 12 displays, as reference information of the application 33, an ID of the application 33, a vendor information of the application 33, and/or creation date/time information of the application 33 on the confirmation screen 91. Furthermore, the CPU 12 displays an OK button 93 and a cancel button 94 on the confirmation screen 91. The end-user 53 can determine whether the application 33 should be executed with checking the information of the application 33 by showing the confirmation screen 91. The CPU 12 terminates the process as shown in FIG. 6 after executing S33.

After executing S65 in FIG. 11, the CPU 12 determines the result of the approval process in S65 (S67). If the OK button 93 is selected on the confirmation screen 91 displayed in S33, then the CPU 12 makes an affirmative decision in S67 (S67:YES) and executes S69. In this case, an instruction for the execution of the half-installed application 33 is received, and the CPU 12 executes the final installation of the application 33 (S69). For example, the CPU 12 updates the flag value related to the application 33 form a value that indicates as the "half-installed state" to a value that indicates as the "completely-installed state", and thereby finishing the installation. As shown in the installing screen 97 in FIG. 7, the CPU 12 executes the installation with displaying on the touch panel 21 that the installation is in progress.

After the success of the installation, the CPU 12 executes the application 33 (S63), and displays the executing screen 81 of the application 33 (see FIG. 7). In this way, in the setup-finished status, it is possible to notice to the end-user 53 that the application 33 that is to be executed was pre-installed by the dealer 52 (i.e. the application 33 is credible).

In the meantime, the CPU 12 may display an error screen 99 when the installation fails due to an occurrence of an error during the installation (S73). The CPU 12 displays an error code on the error screen 99. After that, if an input operation on the touch panel 21 is received, then the CPU 12 displays the standby display 71 on the touch panel 21 (S75).

On the other hand, if the cancel button 94 is selected on the confirmation screen 91 displayed in S33, then the CPU 12 makes a negative decision in S67 (S67:NO) and terminates the process as shown in FIG. 11. In this case, as shown in S77 in FIG. 7, the CPU 12 displays the selection screen 79 on the touch panel 21. In this way, the end-user 53 can cancel the installation of the half-installed application 33 with checking the information of the confirmation screen 91.

Here, the CPU 12 may not execute the confirmation that the application 33 has "half-installed state" when executing the application 33. For example, the CPU 12 may execute S69 without executing S65 and S67 in FIG. 11 after making an affirmative decision in S62 (S62: YES). Alternatively, as shown in FIG. 13, the CPU 12 may display only an OK button 101 for asking an approval (confirmation) of "half-installed state" on the confirmation screen 91. When the OK button 101 is selected, then the CPU 12 makes an affirmative decision in S67 and executes S69. That is, it is possible that the CPU 12 may give notice of the "half-installed state" with not allowing to cancel the installation.

Initialization of the MFP 1

Next, operations of the MFP 1 when an initialization of the setting is executed will be described. The MFP 1 of this embodiment executes the initialization of the setting when a particular operation is received. The term "particular operation" here may be an operation that is not usually executed such as, for example, pushing of a reset switch on a substrate. The term "initialization of the setting" may be a processing by which the setting of the MFP 1 is reset to the factory default such as "Factory Reset". The MFP 1 of this embodiment will not delete from the non-volatile memory 15 an application 33 which has been installed in the setup-unfinished status described above, even if the initialization of the setting is executed. For example, the CPU 12 manages each installed application 33 by a flag value indicating whether the setup status at a time of installation is before or after the completion (the setup-unfinished status or the setup-finished status). When the initialization of the setting is executed, the CPU 12 deletes from the non-volatile memory 15 only such application 33 that was installed in the setup-finished status based on the flag value. It is noted that the method for determining whether the setup status at a time of installation is before or after the completion is not limited to the above described method of using the flag value. For example, the CPU 12 may determine whether the setup status at a time of installation is before or after the completion of the setup by separating the storage area of storing the application 33 between the setup-unfinished status and the setup-finished status.

Furthermore, in accordance with the initialization of the setting, the CPU 12 may reset factor information by which the setup status is determined whether the setup-unfinished status or the setup-finished status. The term "factor information" here may be the information which enables to determine whether the setup-unfinished status or the setup-finished status, such as, as shown in FIG. 5 for example, the information indicating the initial placement of the toner cartridge, the information indicating the setting of the device password, or the information of storing personal information. In this way, the status of the MFP 1 is possible to reset to the setup-unfinished status with maintaining (keeping) the application 33 having the setup-unfinished status. For example, in case of leasing of a MFP 1 which has been rented out to any end-user 53 (e.g. Company A) to another end-user 53 (e.g. Company B), this makes it possible to delete only such application 33 that was installed in the setup-finished status (i.e. installed by an end-user 53 in the company A) and maintain only such application 33 that was installed in the setup-unfinished status (i.e. installed by the dealer 52). And then the CPU 12 clears the information indicating the initial placement of the toner cartridge or the like, and thereby make the MFP 1 return to a status before the rent to the end-user 53. It is noted that the CPU 12 may delete all the application 33 including such application 33 that was installed in the setup-unfinished status when the initialization of the setting is executed, and thereby make the MFP 1 return to its original condition distributed from the manufacturing company 51.

Here, the MFP 1 is one example of an information processing device. The CPU 12 is one example of a controller. The non-volatile memory 15 is one example of a storage device. The printer 16 is one example of an image forming device. The touch panel 21 is one example of a display device. The network interface 24 is one example of a communication interface. The application 33 is one example of a software. The caution screen 83 and the warning screen 87 are the examples of the approval screen.

Effects

The above illustrative embodiment provides the following advantageous effects.

(1) The MFP 1 of the present embodiment includes the network interface 24, the touch panel 21, and the CPU 12. The CPU 12 determines whether the MFP 1 itself is in the setup-finished status in which a certain setup has been done or in the setup-unfinished status in which the certain setup has not been done, when receiving an installation request for the application 33 via the network interface 24 (S11 is an example of the setup status determination process). The CPU 12 displays the approval screen for the installation of the application 33 (i.e. the caution screen 83 or the warning screen 87) on the touch panel 21 (S39, S40 as one example of the displaying process) if the CPU 12 determines that the MFP 1 itself is in the setup-finished status by the process of S13 (S13: YES), and omits the processes of S39 or S40 (as one example of omitting process) if the CPU 12 determines that the MFP 1 itself is in the setup-unfinished status by the process of S13 (S13: NO).

Accordingly, when receiving the installation request via the network interface 24, the CPU 12 omits displaying the approval screen for the installation of the application 33 if the MFP 1 is in the setup-unfinished status in which the certain setup has not been done. Here, if the approval screen is displayed at every installation of the software, the approval operation by operating each of the plurality of MFPs 1 is required when the plurality of the MFPs 1 are to be setup by installing the same application 33. Working hours for the approving operation become longer in proportion to increasing of the number of the MFPs 1 to be setup. On the other hand, by the CPU 12 of the present embodiment, the approval operation for the installation can be omitted in the setup-unfinished status in which the dealer 52 will setup the plurality of MFPs 1 before distributing the MFPs 1 to the end-user 53.

On the other hand, the CPU 12 displays the approval screen for the installation of the application 33 if the MFP 1 is in the setup-finished status. Accordingly, the approval operation by the user is required when the application 33 is to be installed in the setup-finished status (e.g. after the starting of use). In this way, it is possible to prevent the installation of the malicious software or the like. Therefore, it is possible to achieve improvement of both usability by the omission of the approval and security by displaying the approval screen.

(2) The MFP 1 includes the printer 16 which is configured to form images. In S13, the CPU 12 determines as a setup-unfinished status (S23) if the MFP 1 is before the first placement of the toner cartridge, which is one example of a consumable material used by the printer 16 during the printing, onto the printer 16 (S21:NO).

The forming of images with using consumable material such as the toner cartridge has a low possibility of being executed when the image forming apparatus having the image forming section such as the printer 16 is before the using by the end-user 53 or before the sales in a shop. That is, the consumable material has a low possibility of placement to the image forming section. Therefore the CPU 12 will determine as a setup-unfinished status before the toner cartridge is initially placed to the printer 16. In this way, necessary applications 33 can be installed before the placement of the toner cartridge, and thereby the installation can be done efficiently without displaying the approval screen.

(3) The MFP 1 includes the non-volatile memory 15. In S13, if at least one of the personal information and the confidential information is stored in the non-volatile memory 15 (S27: YES), the CPU 12 determines as the setup-finished status (S29).

The personal information here includes, for example, a telephone directory, an email address, or a shortcut key for utilizing the function efficiently. The confidential information includes, for example, secret data (e.g. scan data) generated during use. If such personal information or confidential information is stored in the non-volatile memory 15, there is a high probability that the MFP 1 has been started using by the end-user 53. Therefore the CPU 12 determines as the setup-finished status if the personal information and/or the confidential information is stored in the non-volatile memory 15. In this way, it is possible to determine whether the MFP 1 is in the setup-finished status or in the setup-unfinished status with high accuracy according to the using condition of the end-user 53.

(4) In order for the CPU 12 to determine that the MFP 1 is in the setup-finished status, it is required that the initial setting of the MFP 1 has already been done in S13 (S25: YES). If the initial setting of the MFP 1 has not been done (S25: NO), the CPU 12 determines that the MFP 1 is in the setup-unfinished state (S23).

Here, the initial setting in the present embodiment may include, for example, setting information regarding language to be used, the clock, an IP address, consent configuration for gathering of information for service improvement, and the device password (S25). If the initial setting has been done, there is a high probability that the MFP 1 has been started using by the end-user 53. Therefore the CPU 12 determines as the setup-finished status if the initial setting has been done. In this way, it is possible to determine whether the MFP 1 is in the setup-finished status or in the setup-unfinished status with high accuracy according to the using condition of the end-user 53.

(5) The CPU 12 displays the warning message based on the vendor information of the application 33 on the warning screen 87 in S40. The CPU 12 omits the displaying of the warning message based on the vendor information of the application 33 in the omitting process in the setup-unfinished status.

According to that, in the setup-finished status in which the end-user 53 uses the MFP 1, the warning message is displayed by verifying the vendor information of the application 33 (e.g., the verification of the electronic signature 55). In this way, it is possible to give a warning when such an application 33 that has no guarantee of operation by the manufacturing company 51 is to be installed, and thereby improving the security. On the other hand, when an operator of the manufacturing company 51 or the dealer 52 executes the installation of the necessary application 33 before the MFP 1 will distribute, displaying the warning message is omitted in the setup-unfinished status and thereby improving the efficiency of the installation operation.

(6) The CPU 12 displays information that indicate the application 33 is pre-installed on the touch panel 21 (S33 as one example of a second displaying process) when the application 33 is to be executed in the setup-finished status, if the application 33 has been installed with omitting the displaying process (i.e. the omitting process) in the setup-unfinished status.

According to that, if the application 33 has been installed in the setup-unfinished status, the fact that the application 33 is pre-installed is displayed when the application 33 is used in the setup-finished status. In this way, the end-user 53 can check whether the application 33 has been pre-installed in the setup-unfinished status or not by checking the contents displayed, and thereby determining appropriately whether to use the application 33.

(7) The CPU 12 will not delete the application 33 which has been installed in the setup-unfinished status when the initialization of the MFP 1 is executed, if the application 33 has been installed with omitting the displaying process (i.e. the omitting process) in the setup-unfinished status.

According to that, if the initialization of the setting of the MFP 1 (e.g. "Factory Reset") is executed and the setting of the MFP 1 is reset to the factory default, the application 33 which has been installed in the setup-unfinished status will not be deleted. In this way, if a software which is wanted not to be deleted such as a paid application 33 has been installed in the setup-unfinished status, it is possible to prevent the deletion of such a software.

(8) The CPU 12 will put the application 33, which is started to be installed, into the "half-installed state" in which the installation of the application 33 has not been completed, if the application 33 has been started to be installed with omitting the displaying process (i.e. the omitting process) in the setup-unfinished status. If the CPU 12 receives an instruction for the execution of the half-installed application 33 in the setup-finished status (S62:YES), the CPU 12 will notice that the application 33 is in the "half-installed state", and after the notice, the CPU 12 will complete the installation and execute the application 33 (S65, S69, S63).

According to that, the installation of the application 33 is started with omitting the displaying process of the approval screen in the setup-unfinished status and put into the "half-installed state". And if the instruction for the execution of the half-installed application 33 is received in the setup-finished status, the application 33 will be executed after noticing that the application 33 is in the "half-installed state." In this way, the end-user 53 can execute the final installation of the application 33 with checking the fact that the application 33 is in the "half-installed state", and then use the application 33 by activating it.

MODIFICATIONS

It should be noted that the present embodiment does not need to be limited to the illustrative embodiment described above, and various modification can be realized without departing from the scope of the invention. For example, the software in this application does not need to be limited to the application 33, but may be also applicable to an add-on program or an operating system. Furthermore, while not specifically stated in the embodiment described above, the MFP 1 may be configured to prohibit deletion (uninstallation) of the software (e.g. the application 33 or the like) which has been installed in the setup-unfinished status, if the MFP 1 is operated in the setup-finished status (i.e. when used by the end-user 53). For example, the CPU 12 may prohibit deletion of the application 33 in the setup-unfinished status as far as the end-user 53 can operate. Furthermore, in the setup status determination process shown in FIG. 5, the CPU 12 may be allowed to be configured to execute at least one of the determination process in S21 (determining whether the initial introduction has been done), S25 (determining whether the device password has been set) and S27 (determining whether the personal information or the like has been stored). In addition, it is also permitted that the CPU 12 may change the execution order of S21, S25 and S27. The MFP 1 is also permitted to be configured not to execute the half-installation of the software.

In the above-described embodiment, the CPU 12 which executes a certain program has been adopted as the control section for this embodiment, but the present embodiment does not need to be limited to this example. For example, a specialized hardware such as an ASIC can be used for the control section. Furthermore, a combination of software process and hardware process can also implement the present embodiment as the control section. In addition, the MFP 1 as a multifunction peripheral machine is adopted for the information processing device of the present embodiment as described above, but it does not need to be limited to. The information processing device of the present embodiment may be applied to many other apparatuses in which a software can be installed, such as a printer device that has only printing function and a sewing machine.

What is claimed is:

1. An information processing apparatus comprising:
    a communication interface;
    a memory;
    a display device; and
        a controller comprising hardware, the controller being configured to perform:
    in response to receipt of an installation request for installing of a software via the communication interface, reading the memory to determined a status of the information processing apparatus, the status being one of a setup-finished status in which a certain setup has been done, and
    a setup-unfinished status in which the certain setup has not been done;
    in response to the memory reading indicating that the information processing apparatus is in the setup-finished status:
        displaying, on the display device, an approval screen prompting a user to approve or not to approve installation of the software; and
        installing the software in response to the user approving installation of the software;
    in response to the memory reading indicating that the information processing apparatus is in the setup-unfinished status:
        allowing installation of the software accordance with the installation request without displaying of the approval screen; and
    when an instruction to execute software of which an installation state is a half-installed state is received in the setup-finished status, notifying that the installation state of the software is in the half-installed state, completing the installation of the software and executing the software.

2. The information processing apparatus according to claim 1,
    further comprising an image forming device configured to form images,
    wherein the controller is further configured to determine that the information processing apparatus is in the setup-unfinished status before a first placement of a consumable part which is used by the image forming device when the images are formed.

3. The information processing apparatus according to claim 1,
    further comprising a storage device,
    wherein the controller is further configured to determine that the information processing apparatus is in the setup-unfinished status when at least one of personal information and confidential information is not stored in the storage device.

4. The information processing apparatus according to claim 1,
    wherein the controller is further configured to determine that the information processing apparatus is in the setup-unfinished status when an initial setting of the information processing apparatus has not been done.

5. The information processing apparatus according to claim 1,
    wherein the controller is further configured to perform:
    displaying a warning based on a vendor information of the software on the approval screen in the displaying the approval screen.

6. The information processing apparatus according to claim 1,
    wherein, when the software has been installed on the information processing apparatus which is in the setup-unfinished status and when the software is to be executed with the information processing apparatus being in the setup-finished status, the controller is further configured to perform displaying, on the display device, information indicating that the software has already been installed.

7. The information processing apparatus according to claim 1,
    wherein, when the software has been installed on the information processing apparatus which is in the setup-unfinished status and when the initialization of the information processing apparatus is executed, the controller is configured not to delete the software which has been installed when the information processing apparatus is in the setup-unfinished status.

8. The information processing apparatus according to claim 1,
    wherein the controller is further configured to:
    when installation of the software on the information processing apparatus which is in the setup-unfinished status has been started, install the software on the information processing apparatus in the half-installed state in which the installation of the software has not been completed.

9. A method of installing software on an information processing apparatus provided with a communication interface, a memory and a display device,
    the method comprising:
    in response to receipt of an installation request requesting for installation of a software via the communication interface, reading the memory to determine a status of the information processing apparatus, the status being one of a setup-finished status in which a certain setup has been done, and a setup-unfinished status in which the certain setup has not been done;
    in response to the memory reading indicating that the information processing apparatus is in the setup-finished status:
        displaying, on the display device, an approval screen prompting a user to approve or not to approve installation of the software; and
        installing the software in response to the user approving installation of the software;
    in response to the memory reading indicating that the information processing apparatus is in the setup-unfinished status:
        allowing installation of the software in accordance with the installation request without displaying the approval screen, and
    when an instruction to execute the software of which an installation state is a half-installed state is received in the setup-installed state, completing the installation of the software and executing the software.

10. The method according to claim 9,
    further including determining that the information processing apparatus is in the setup-unfinished status before a first placement of a consumable part which is used by an image forming device of the information processing device when the images are formed.

11. The method according to claim 9, further including determining that the information processing apparatus is in the setup-unfinished status when at least one of personal information and confidential information is not stored in a storage device of the information processing device.

12. The method according to claim 9, further including determining that the information processing apparatus is in the setup-unfinished status when an initial setting of the information processing apparatus has not been done.

13. The method according to claim 9, further including:
displaying a warning based on a vendor information of the software on the approval screen in the displaying the approval screen.

14. A non-transitory computer-readable storage medium for an information processing apparatus provided with a communication interface, a memory, a display device and a controller comprising hardware, the storage storing computer-executable instructions which cause, when executed by the controller, the information processing apparatus to perform:
in response to receipt of an installation request for installing of a software via the communication interface, reading the memory to determine a status of the information processing apparatus, the status being one of a setup-finished status in which a certain setup has been done, and a setup-unfinished status in which the certain setup has not been done;
in response to the memory reading indicating that the information processing apparatus is in the setup-finished status:
displaying, on the display device, an approval screen prompting a user to approve or not to approve installation of the software; and
installing the software in response to the user approving installation of the software;
in response to the memory reading indicating that the information processing apparatus is in the setup-unfinished status:
allowing installation of the software in accordance with the installation request without displaying the approval screen; and
when an instruction to execute the software of which an installation state is a half-installed state is received in the setup-finished status, notifying that the installation state of the software is in the half-installed state, completing the installation of the software and executing the software.

15. An information processing apparatus comprising:
a communication interface;
a memory;
a user interface; and
a controller comprising hardware, the controller being configured to perform:
in response to receipt of a request for installation of software in the information processing apparatus via the communication interface, reading the memory to determine a status of the information processing apparatus, the status being one of a first setup status and second status;
in response to the memory reading indicating that the information processing apparatus is in the first setup status, obtaining user approval of installation through the user interface and installing the software in accordance with the request for installation when the user approval is obtained;
in response to the memory reading indicating that the information processing apparatus is in the second setup status, installing the software in accordance with the request for installation without obtaining the user approval through the user interface; and
when an instruction to execute the software of which an installation state is an half-installed state is in the half-installed state, completing the installation of the software and executing the software.

16. The information processing apparatus according to claim 15,
wherein the first setup status is a setup-finished status and the second setup status is a setup-unfinished status, the setup-finished status being a status in which a certain setup of the information processing apparatus has been done, the setup-unfinished status being a status in which the certain setup of the information processing apparatus has not been done.

17. The information processing apparatus according to claim 16,
further comprising an image forming device configured to form images,
wherein the controller is further configured to determine that the information processing apparatus is in the setup-unfinished status before a first placement of a consumable part which is used by the image forming device when the images are formed.

18. The information processing apparatus according to claim 16,
further comprising a storage device,
wherein the controller is further configured to determine that the information processing apparatus is in the setup-unfinished status when at least one of personal information and confidential information is not stored in the storage device.

19. The information processing apparatus according to claim 16,
wherein the controller is further configured to determine that the information processing apparatus is in the setup-unfinished status when an initial setting of the information processing apparatus has not been done.

20. The information processing apparatus according to claim 16,
wherein the controller is further configured to perform:
displaying a warning based on a vendor information of the software on the approval screen in the displaying the approval screen.

* * * * *

UNITED STATES PATENT AND TRADEMARK OFFICE
CERTIFICATE OF CORRECTION

PATENT NO. : 11,321,067 B2
APPLICATION NO. : 17/031038
DATED : May 3, 2022
INVENTOR(S) : Tetsuya Okuno It is certified that error appears in the above-identified patent and that said Letters Patent is hereby corrected as shown below:

In the Claims

Column 21, Claim 1, Line 36 should read:
allowing installation of the software in accordance with Column 22, Claim 9, Line 59 should read:
when an instruction to execute the software of which an Column 22, Claim 9, Line 59 should read:
approval screen; and Signed and Sealed this
Twenty-seventh Day of December, 2022

Katherine Kelly Vidal
*Director of the United States Patent and Trademark Office*